United States Patent
Erskine et al.

(10) Patent No.: US 10,539,477 B2
(45) Date of Patent: Jan. 21, 2020

(54) CONDITION MONITORING

(71) Applicant: Aktiebolaget SKF, Gothenburg (SE)

(72) Inventors: Joseph Erskine, Falkirk (GB); Andrew Campbell, East Kilbride (GB); Allan Thomson, Lanark (GB)

(73) Assignee: AKTIEBOLOGET SKF, Gothenburg (SE)

( * ) Notice: Subject to any disclaimer, the term of this patent is extended or adjusted under 35 U.S.C. 154(b) by 0 days.

(21) Appl. No.: 16/160,078

(22) Filed: Oct. 15, 2018

(65) Prior Publication Data

US 2019/0195710 A1   Jun. 27, 2019

(30) Foreign Application Priority Data

Feb. 1, 2017 (DE) .......................... 10 2017 223 628

(51) Int. Cl.
*F16C 41/00* (2006.01)
*G01L 5/00* (2006.01)

(52) U.S. Cl.
CPC .......... *G01L 5/0019* (2013.01); *G01L 5/0076* (2013.01)

(58) Field of Classification Search
CPC .... F16C 19/361; F16C 19/364; F16C 19/383; F16C 19/44; F16C 19/46; F16C 19/48; F16C 19/522; F16C 33/586; F16C 2233/00; G01L 5/0019; G01L 5/0076
See application file for complete search history.

(56) References Cited

U.S. PATENT DOCUMENTS

| | | | | |
|---|---|---|---|---|
| 4,203,319 A * | 5/1980 | Lechler | .................. | B23Q 17/09 73/862.541 |
| 5,952,587 A * | 9/1999 | Rhodes | .................. | F16C 19/364 73/862.541 |
| 6,490,935 B1 * | 12/2002 | Joki | ....................... | G01L 3/1464 73/862.49 |
| 7,650,254 B2 * | 1/2010 | Pecher | .................... | G01M 1/22 384/448 |
| 2002/0057856 A1 * | 5/2002 | Bailey | ................... | F16C 19/364 384/448 |
| 2007/0143039 A1 * | 6/2007 | Mol | ....................... | G01L 5/0009 702/41 |
| 2018/0231059 A1 * | 8/2018 | Kiyonaga | ............. | F16C 19/361 |

* cited by examiner

*Primary Examiner* — Phillip A Johnson
(74) *Attorney, Agent, or Firm* — Garcia-Zamor Intellectual Property Law, LLC; Ruy Garcia-Zamor; Bryan Peckjian

(57) ABSTRACT

A rolling element bearing may potentially experience uneven loads across the length of its rolling elements due to either one or more of design errors, manufacturing errors or installation errors or any combination of these errors. The invention enables a physical measurement to be carried out on these potentially uneven loads on the rolling elements of a rolling element bearing by a technique that makes use of two or more load or strain sensors for measurement of roller load induced strain signals along a length of a rolling element in a rolling element bearing with rollers, such as cylindrical rollers for bearing arrangements.

12 Claims, 2 Drawing Sheets

CONDITION MONITORING

CROSS-REFERENCE

This application claims priority to German patent application no. 102017223628.0 filed on Dec. 21, 2017, the contents of which are fully incorporated herein by reference.

TECHNOLOGICAL FIELD

The invention concerns condition monitoring of rolling element bearings more particularly directed to rolling element bearings with rollers, such as cylindrical rollers.

BACKGROUND

A rolling element bearing comprises an inner ring, an outer ring and several rolling elements or bodies installed between these two rings. In relation to the invention these rolling elements are rollers or needles. In the meaning of the invention, a rolling bearing and a rolling element bearing are for instance a roller bearing or a needle bearing, such as spherical roller bearings (SRB), tapered roller bearings (TRB), or CARB toroidal roller bearings.

In the field of rolling element bearings, it is known to attach one or more sensors to measure one or more physical parameters and transduce these physical parameters into electrical signals. One such example is the use of a load or strain sensor in order to determine a load that a bearing is subjected to in for example a loaded zone. This can be done to determine a load a machine is subjected to. For instance, truck lifts are equipped with forks to lift and move a load. The maximum load the forks are lifting/subjected to must be controlled for safety reasons. Determining a load that a bearing is subjected to can also be done for the purpose of determining a current and possibly a future condition of the bearing.

Determining the load a bearing with rollers is subjected to is challenging, especially in larger size bearings. Where should the load or strain sensor be placed? There is still room for improvements.

SUMMARY

An object of the invention is to define a method of measuring roller load in a rolling element bearing along the length of a rolling element.

The aforementioned object is achieved according to the invention by a technique that makes use of two or more load or strain sensors for measurement of roller load induced strain signals along a length of a rolling element in a rolling element bearing with rollers, such as cylindrical rollers e.g. SRB, TRB, CARB or SKF Nautilus bearings and other similar bearing arrangements. A rolling element bearing may experience uneven loads across the length of its rolling elements due to either one or more of design errors, manufacturing errors or installation errors or any combination of these errors. Additionally there may be occasions where due to operating conditions the bearing may experience uneven loads across the length of its rolling elements. The invention allows for a physical measurement to be carried out on these potential uneven loads on the rolling elements of a rolling element bearing.

According to a first embodiment of the invention, a combination of two or more sensor packages are mounted across the roller raceway. These sensor packages are positioned at a small distance apart from each other such that the measurement of roller load induced strain signals in a rolling element bearing with cylindrical rollers can be achieved along the roller. The measurement signals from the strain or loads sensors can either be captured separately or by simultaneous acquisition methods. If the measurements are done by simultaneous time acquisition methods rather than being captured separately, then a more detailed analysis of the signals can be achieved, since the load or strain across the rolling element length is measured at the same instant in time. However, this does not to preclude the use of separate time acquisition methods being used for the measurement, especially if a variation in load is slower than the measurement rate.

To enable two or more sensor packages to be fitted easily into a large size bearing (LSB) according to the first embodiment of the invention, it is proposed that the sensor packages are either all fitted on the side face of the bearings being measured, or alternatively the sensor packages are all fitted on the inner bore face of the bearings being measured, or alternatively the sensor packages are fitted to both the side face and inner bore face of the bearings being measured.

The simplest form of the invention according to the first embodiment would be where only two strain or load sensor packages are used and located towards both ends of the roller raceways. Additionally other sensor measurement technologies could also be inserted into the sensor packages, for example acoustic emission, vibration and temperature to name just a few. Depending upon the size and complexity of the interface measurement circuitry (for example ADC and microprocessor) to the various sensors technologies then the interface circuitry could either be housed inside the sensor packages or additionally housed externally on the bearing surface or at a distance from the bearing.

It is further proposed that piezoelectric strain sensing technology is used in the first embodiment of the invention in preference to other strain or load measurement techniques, but this invention does not preclude the use of other suitable strain and load sensing technologies in this design. The benefits of the piezoelectric strain sensing technology is that the sensor can be fitted to curved surfaces, it can be pressed against the slide face of a drilled hole without having to glue or otherwise permanently attached to its measurement surface. The piezoelectric sensor is both cheap, robust and reliable.

According to a second embodiment of the invention, a combination of two of more strain or loads sensors are mounted inside a machined, e.g. drilled, channel or hole inside a bearing ring. The channel or hole is preferably parallel or at least substantially parallel to a roller raceway of the bearing ring. By the method of using of two of more strain or loads sensors which are positioned at a distance apart from each other such that the measurement of roller load induced strain signals in a rolling element bearing with rollers, e.g. cylindrical roller, can be achieved along the roller. The resultant measurements signals from the strain or loads sensors can either be captured separately or by simultaneous acquisition methods. If the measurements are done by simultaneous time acquisition methods rather than being captured separately, then a more detailed analysis of the signals can be achieved, since the load or strain across the rolling element length is measured at the same instant in time. However this does not preclude the use of separate time acquisition methods also being used for the measurement, especially if a variation in load is slower than the measurement rate.

To enable two or more strain or loads sensors to be fitted easily into large size bearing (LSB) according to the second embodiment of the invention, it is proposed that a small diameter circular hole is machined, e.g. drilled, into the bearing ring which is subjected to the major loading of the bearing, and that the circular hole is preferably to be machined in parallel with the roller raceway of that ring. Other shaped holes may be used which are not circular in nature, but the most economical and simplest method of manufacturing such a hole or channel would be a hole which is circular in nature. For example with the SKF Nautilus bearing the bearing's rollers are angled at 45 degrees, with the contact pressure from the bearing being passed into the inner rings of the bearing. Thus it is proposed that a circular drilled hole is made into both raceways on both of the inner rings, thus enabling the both raceways to be monitored at the same angle of the rollers i.e. 45 degrees. The multiple strain or loads sensors would be fitted into the long circular tube whose diameter is just slightly smaller than the pre-drilled hole in the bearing inner ring. The multiple strain or load sensors would be spaced apart from each other to allow the measurement of different areas of the bearings rollers to be monitored.

The simplest form of this second embodiment of the invention would be using only two strain or loads sensors located towards both ends of each of the roller raceways to be measured. Additionally other sensor measurement technologies could also be inserted into a long circular tube, for example acoustic emission, vibration and temperature to name just a few. Depending upon the size and complexity of the interface measurement circuitry (for example ADC and microprocessor) to the various sensors technologies then the interface circuitry could either be housed inside the long circular tube or additionally housed externally on the bearing surface or at a distance from the bearing.

It is further proposed that piezoelectric strain sensing technology is also used in the second embodiment in preference to other strain or load measurement techniques, but this invention does not preclude the use of other suitable strain and load sensing technologies in this design. The benefits of the piezoelectric strain sensing technology is that the sensor can be fitted to curved surfaces, and it can be pressed against the slide face of a drilled hole and slide into the hole without being damaged or having to glue or otherwise permanently attached to its measurement surface. The piezoelectric sensor is cheap, robust and reliable.

The aforementioned object is also achieved according to the invention by a method of measuring roller load in a rolling element bearing along the length of a roller. The bearing comprising an inner ring with a raceway, an outer ring with a raceway and several rolling elements or bodies installed between these rings. The rolling elements are rollers or needles. According to the invention the method comprises placing two or more load or strain sensors spread along a first, virtual, line that is substantially parallel to and at a predetermined distance from a second line where a roller contacts a raceway. The first line can also be seen as a parallel projection of the second line onto the first line, or just a parallel displacement of the second line. The second line can also be across the raceway, or a tangent of the raceway at the middle of across the raceway parallel to the length of the rollers of the raceway at that point and the length of a roller length. This enables measuring and detecting an uneven load along the length of a loaded roller.

Preferably the two or more load or strain sensors are placed along the first line within a length of the second line. Suitably the two or more load or strain sensors are placed symmetrically along the first line in relation to the second line.

In some embodiments of the invention preferably the two or more load or strain sensors are placed in individual sensor packages. Optionally at least one of the individual sensor packages comprises additional sensors for measuring one or more of temperature, vibration and acoustic emission. Acquisition electronics and a communication interface can suitably be integrated with the individual sensor packages.

In other embodiments of the invention preferably the two or more load or strain sensors are placed in a hole or channel along the first line. Acquisition electronics and a communication interface can suitably be integrated into or with the hole or channel.

The load or strain sensors are preferably piezoelectric strain sensors.

The different additional enhancements of the method of measuring roller load in a rolling element bearing along the length of a roller according to the invention can be combined in any desired manner as long as no conflicting features are combined.

Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 3.

Figure 1:
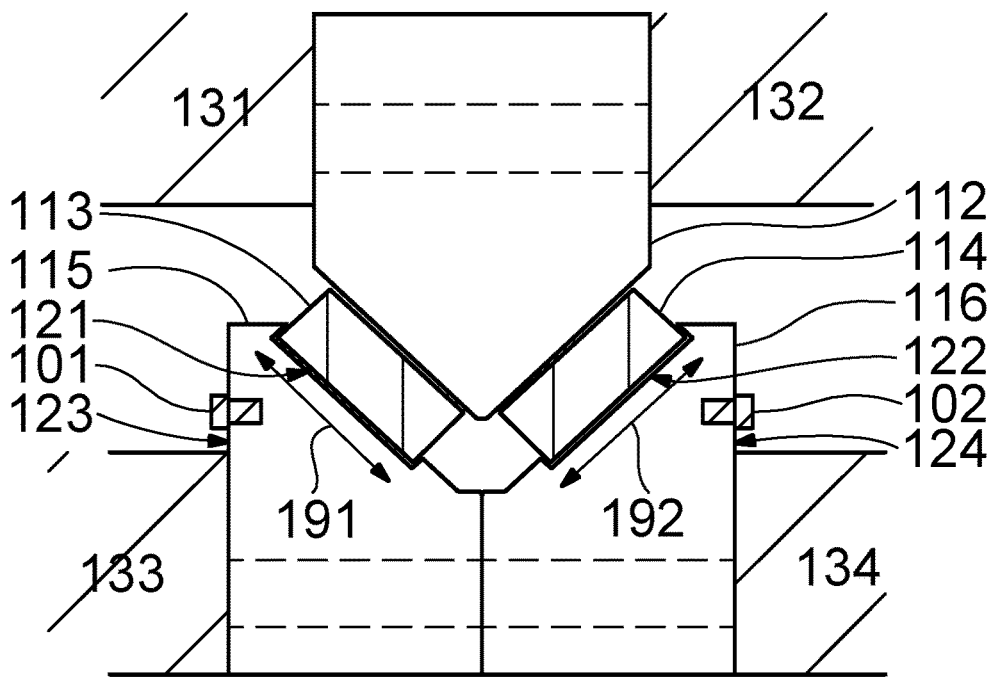
FIG. 1 illustrates a double row tapered roller bearing with traditional roller load sensors.

FIG. 1 illustrates a double row tapered roller bearing with traditional roller load sensors. The bearing comprises an outer ring 112, an inner ring 115 for the first row with its inner ring raceway 121, an inner ring 116 for the second row with its inner ring raceway 122, rollers of the first row 113 and rollers of the second row 114. The rollers 113, 114 being located between corresponding inner ring 115, 116 and the common outer ring 112. To enable measuring roller load on each corresponding inner ring raceway 121, 122, the bearing is fitted with one load or strain sensor package 101, 102 for each corresponding inner ring raceway 121, 122. These packages 101, 102, are located in the ring comprising the raceway that is to be monitored, in this case the into the inner rings 215, 216 from the side faces 123, 124 as there are several areas 131, 132, 133, 134 that are not accessible for mounting sensors or sensor packages. As can be seen in this example, the sensor packages 101, 102 are not properly aligned to the corresponding raceways 121, 122, or rollers 113, 114. The length 191, 192 across a raceway and along a roller is quite substantial in large size bearings, also in relation to the size of a sensor package. Using only one load sensor per raceway will at best pick up a total induced roller load and if there is an uneven load. A rolling element bearing may experience uneven loads across the length of its rolling elements due to either one or more of design errors, manufacturing errors or installation errors or any combination of these errors. A single sensor package might show a lower load if a load sensor of a sensor package is aligned with the side of the raceway with a lower load. A single sensor package cannot determine if there is an uneven load, and if there is an uneven load, the single sensor package cannot determine what it is measuring.

The invention allows for a physical measurement to be carried out on these potential uneven loads on the rolling elements of a rolling element bearing by a technique that makes use of two or more load or strain sensors for each raceway for measurement of roller load induced strain signals along a length of a rolling element in a rolling element bearing with rollers, such as cylindrical rollers e.g. SRB, TRB, CARB or SKF Nautilus bearings and other similar bearing arrangements. The two or more load or strain sensors are spread out along the length of a roller, across a raceway.

Figure 2:
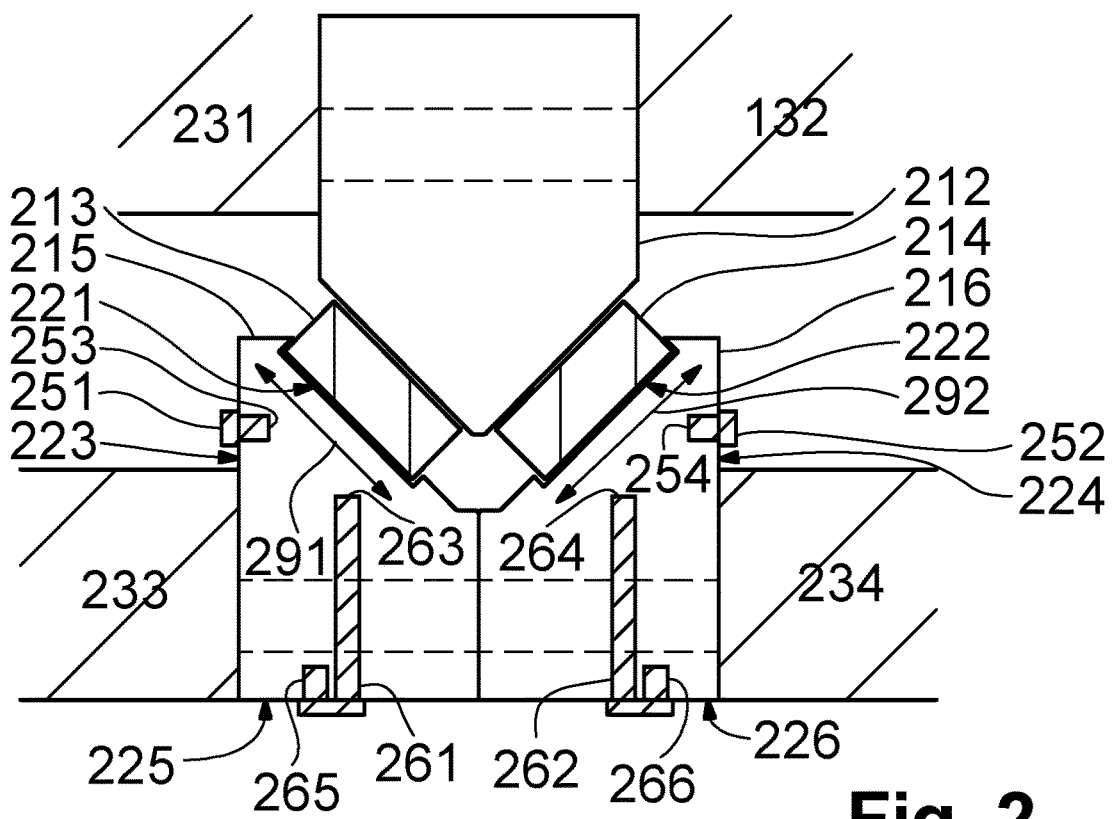
FIG. 2 illustrates a double row tapered roller bearing with roller load sensors according to a first embodiment of the invention.

FIG. 2 illustrates a double row tapered roller bearing with roller load sensors according to a first embodiment of the invention. It illustrates a same type of bearing as in FIG. 1 with certain areas 231, 232, 233, 234, not being accessible for sensor or sensor package mounting. The bearing comprises an outer ring 212, an inner ring 215 for the first row with its inner ring raceway 221, an inner ring 216 for the second row with its inner ring raceway 222, rollers of the first row 213 and rollers of the second row 214. The rollers 213, 214 being located between corresponding inner ring 215, 216 and the common outer ring 212. According to the invention there are two or more strain or load sensors 253, 254, 263, 264 for each raceway 221, 222. Each strain or load sensor 253, 254, 263, 264 is included in a corresponding load or strain sensor package 251, 252, 261, 262. The strain or load sensors 253, 254, 263, 264 are spread out across 291, 292, each corresponding raceway 221, 222, and located such that each sensor 253, 254, 263, 264 is at approximately the same perpendicular distance from its corresponding raceway 221, 222 as at least the other sensors of the same raceway. The load or strain sensors should preferably be at least approximately along a virtual line that is substantially parallel to the raceway that the sensors are to monitor. This will simplify any necessary signal processing and interpretation of signals from the sensors so that they can be better correlated. The sensors should be spread so that both end parts of a roller are covered and at least in part separately distinguishable to thereby enable detection of an uneven load across a raceway.

Due to restrictions in available space for mounting sensors on the rings, in this example of monitoring the two inner raceways the sensor packages are mounted on the side faces 223, 224 of the inner rings and on the inner bore faces 225, 226 of the inner rings.

As illustrated with the second load or strain sensor packages 261, 262 of the first and second row, there be integrated optional sensor packages 265, 266 that comprises other sensors such as temperature and vibration sensors.

Figure 3:
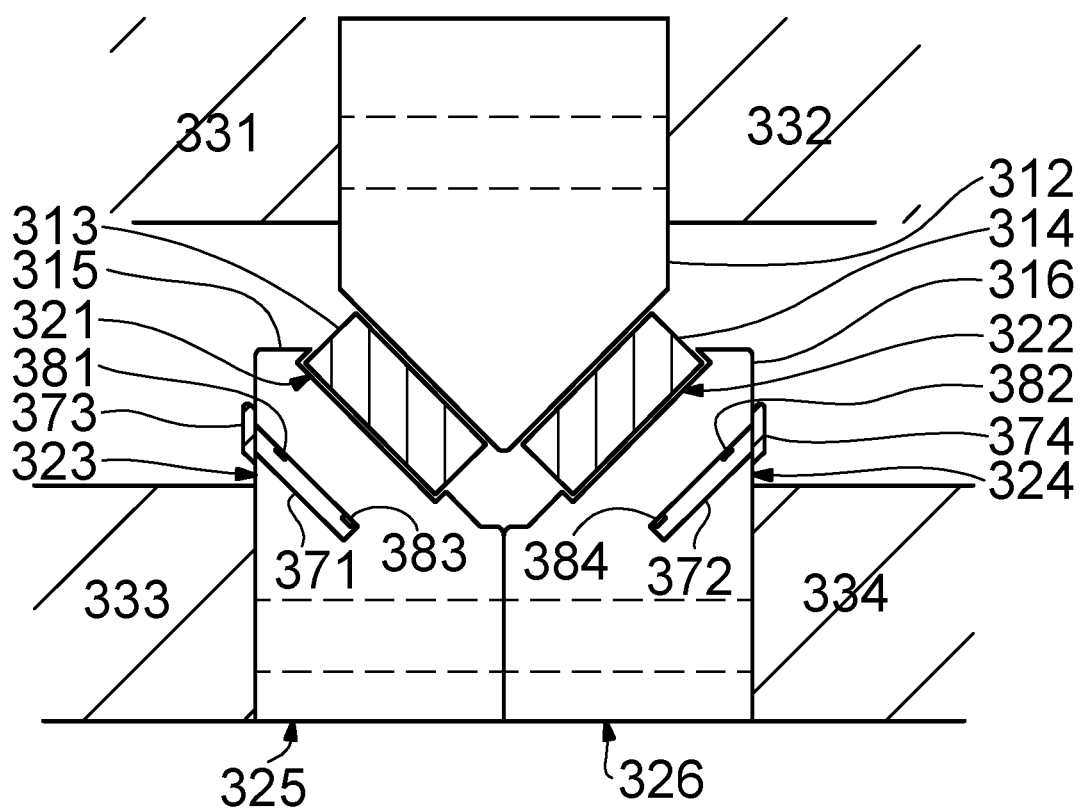
FIG. 3 illustrates a double row tapered roller bearing with roller load sensors according to a second embodiment of the invention.

FIG. 3 illustrates a double row tapered roller bearing with roller load sensors according to a second embodiment of the invention. It illustrates a similar type of bearing as in FIG. 2 with certain areas 331, 332, 333, 334, not being accessible for sensor or sensor package mounting. The bearing comprises an outer ring 312, an inner ring 315 for the first row with its inner ring raceway 321, an inner ring 316 for the second row with its inner ring raceway 322, rollers of the first row 313 and rollers of the second row 314. The rollers 313, 314 being located between corresponding inner ring 315, 316 and the common outer ring 312. According to the invention there are two or more strain or load sensors 381, 382, 383, 384 for each raceway 321, 322. The two or more strain or load sensors 381, 383 of the first row are mounted within a first channel or hole 371 used for measuring roller load on the inner ring raceway 321 of the first row. The first channel or hole 371 is into the side face 323 of the first row inner ring 315, its extension preferably substantially parallel to the inner ring raceway 321 and rollers 313 of the first row. Likewise the two or more strain or load sensors 382, 384 of the second row are mounted within a second channel or hole 372 used for measuring roller load on the inner ring raceway 322 of the second row. The second channel or hole 372 is into the side face 324 of the second row inner ring 316, its extension preferably substantially parallel to the inner ring raceway 322 and rollers 314 of the second row. The channels or holes 371, 372 may of course enter into another available face, such as the inner ring inner bore faces 325, 326, depending on the total geometry of a ring in question in relation to its raceway. The electronics and communication packages 373, 374 may be located within the respective channels or holes 371, 372, externally on the respective side face 323, 324 as illustrated, or remotely.

The invention is based on the basic inventive idea of having two or more load or strain sensors spread out across a raceway, along the length of a roller, to thereby be able to measure the distribution of roller induced load in a rolling element bearing with rollers, such as cylindrical rollers e.g. SRB, TRB, CARB or SKF Nautilus bearings and other similar bearing arrangements. Since a rolling element bearing may experience uneven loads across the length of its rolling elements due to operating conditions or due to either one or more of design errors, manufacturing errors or installation errors or any combination of these errors, the invention allows for a physical measurement to be carried out on these potential uneven loads on the rolling elements of a rolling element bearing by being able to measure the distribution of the load along the length of a roller, across the raceway.

The invention is not restricted to the above-described embodiments, but may be varied within the scope of the following claims.

FIG. 1 illustrates a double row tapered roller bearing with traditional roller load sensors:

101 Load or strain sensor package of first row for measuring roller load,
102 Load or strain sensor package of second row for measuring roller load,
112 Outer ring,
113 Roller of first row,
114 Roller of second row,
115 Inner ring of first row,
116 Inner ring of second row,
121 Inner ring raceway of first row,
122 Inner ring raceway of second row,
123 Side face of first row inner ring,
124 Side face of second row inner ring,
131 First side of outer ring area not accessible for sensor mounting,
132 Second side of outer ring area not accessible for sensor mounting,
133 First row inner ring side face area not accessible for sensor mounting,
134 Second row inner ring side face area not accessible for sensor mounting,
191 Across first row inner ring raceway, along first row roller,
192 Across second row inner ring raceway, along first roller.

FIG. 2 illustrates a double row tapered roller bearing with roller load sensors according to a first embodiment of the invention:
212 Outer ring,
213 Roller of first row,
214 Roller of second row,
215 Inner ring of first row,
216 Inner ring of second row,
221 Inner ring raceway of first row,
222 Inner ring raceway of second row,
223 Side face of first row inner ring,
224 Side face of second row inner ring,
225 First row inner ring inner bore face,
226 Second row inner ring inner bore face,
231 First side of outer ring area not accessible for sensor mounting,
232 Second side of outer ring area not accessible for sensor mounting,
233 First row inner ring side face area not accessible for sensor mounting,
234 Second row inner ring side face area not accessible for sensor mounting
251 First load or strain sensor package of first row for measuring roller load on inner ring raceway of first row, sensor package mounted into side face of first row inner ring,
252 First load or strain sensor package of second row for measuring roller load on inner ring raceway of second row, sensor package mounted into side face of second row inner ring,
253 Sensor of first load or strain sensor package of first row,
254 Sensor of first load or strain sensor package of second row,
261 Second load or strain sensor package of first row for measuring roller load on inner ring raceway of first row, sensor package mounted into first row inner ring bore face,
262 Second load or strain sensor package of second row for measuring roller load on inner ring raceway of second row, sensor package mounted into second row inner ring bore face,
263 Sensor of second load or strain sensor package of first row,
264 Sensor of second load of strain sensor package of second row,
265 Optional sensor package of second load or strain sensor package of first row,
266 Optional sensor package of second load or strain sensor package of second row,
291 Across first row inner ring raceway, along first row roller,
292 Across second row inner ring raceway, along first roller.

FIG. 3 illustrates a double row tapered roller bearing with roller load sensors according to a second embodiment of the invention:
312 Outer ring,
313 Roller of first row,
314 Roller of second row,
315 Inner ring of first row,
316 Inner ring of second row,
321 Inner ring raceway of first row,
322 Inner ring raceway of second row,
323 Side face of first row inner ring,
324 Side face of second row inner ring,
325 First row inner ring inner bore face,
326 Second row inner ring inner bore face,
331 First side of outer ring area not accessible for sensor mounting,
332 Second side of outer ring area not accessible for sensor mounting,
333 First row inner ring side face area not accessible for sensor mounting,
334 Second row inner ring side face area not accessible for sensor mounting.
371 First channel or hole used for measuring roller load on inner ring raceway of first row, the channel or hole is into the side face of the first row inner ring, its extension preferably substantially parallel to the inner ring raceway of the first row,
372 Second channel or hole used for measuring roller load on inner ring raceway of second row, channel or hole is into the side face of the second row inner ring, its extension preferably substantially parallel to the inner ring raceway of the first row,
373 Electronics and communication package of the first channel or hole sensors,
373 Electronics and communication package of the second channel or hole sensors,
381 First load or strain sensor of first channel,
382 First load or strain sensor of second channel,
383 Second load or strain sensor of first channel,
384 Second load or strain sensor of second channel

What is claimed is:
1. A method of measuring roller load in a rolling element bearing comprising an inner ring with an inner raceway, an outer ring with an outer raceway, and a plurality of rolling elements or bodies installed between the inner and outer rings, the plurality of rolling elements or bodies being rollers or needles, the method comprising:
placing two or more load or strain sensors along a first line that is substantially parallel to and at a predetermined distance from a second line located at where the plurality of rolling elements or bodies contact the inner raceway, the second line being parallel to a length of the plurality of rolling elements or bodies;
measuring the roller load along the length of the plurality of rolling elements or bodies; and
detecting an uneven load within the roller load.
2. The method of measuring roller load according to claim 1, wherein the predetermined distance is within a length of the second line.
3. The method of measuring roller load according to claim 1, wherein the two or more load or strain sensors are placed symmetrically along the first line in relation to the second line.
4. The method of measuring roller load according to claim 1, wherein the two or more load or strain sensors are placed in individual sensor packages.
5. The method of measuring roller load according to any claim 4, wherein at least one of the individual sensor packages comprises additional sensors for measuring one or more of temperature, vibration and acoustic emission.
6. The method of measuring roller load according to claim 4, further comprising acquisition electronics and a communication interface integrated with the individual sensor packages.
7. The method of measuring roller load according to claim 1, wherein the two or more load or strain sensors are placed in a hole or channel along the first line.
8. The method of measuring roller load according to claim 7, wherein acquisition electronics and a communication interface is integrated into or with the hole or channel.

9. The method of measuring roller load according to claim 1, wherein the two or more load or strain sensors are piezoelectric strain sensors.

10. The method of measuring roller load according to claim 1, wherein the predetermined distance is a perpendicular distance from the second line.

11. The method of measuring roller load according to claim 1, wherein a first sensor of the two or more load or strain sensors is mounted on a side face of the inner ring, and
wherein a second sensor of the two or more load or strain sensors is mounted on an inner bore face of the inner ring.

12. A system comprising:
a rolling element bearing comprising an inner ring with an inner raceway, an outer ring with an outer raceway, and a plurality of rolling elements or bodies installed between the inner and outer rings, the plurality of rolling elements or bodies being rollers or needles; and
two or more load or strain sensors located along a first line that is substantially parallel to and at a predetermined distance from a second line located at where the plurality of rolling elements or bodies contact the inner raceway, the second line being parallel to a length of the plurality of rolling elements or bodies,
wherein a first sensor of the two or more load or strain sensors is mounted on a side face of the inner ring,
wherein a second sensor of the two or more load or strain sensors is mounted on an inner bore face of the inner ring, and
wherein the two or more load or strain sensors measure a roller load along the length of the plurality of rolling elements or bodies.

* * * * *